United States Patent [19]
Vion et al.

[11] Patent Number: 5,503,747
[45] Date of Patent: Apr. 2, 1996

[54] DEVICE FOR TREATING WASTE WATER ESPECIALLY RAINWATER

[75] Inventors: Patrick Vion, Houilles; Hervé Labaquere, Amberieux en Dombes, both of France

[73] Assignee: Degremont, Rueil Malmaison, France

[21] Appl. No.: 268,014

[22] Filed: Jun. 29, 1994

[30] Foreign Application Priority Data

Jun. 30, 1993 [FR] France .................................. 93 08007

[51] Int. Cl.⁶ .................................................. B01D 21/02
[52] U.S. Cl. .......................... 210/519; 210/521; 210/540
[58] Field of Search ..................................... 210/519, 521, 210/532.1, 538, 540, 523

[56] References Cited

U.S. PATENT DOCUMENTS

| | | | |
|---|---|---|---|
| 1,190,863 | 7/1916 | Corne et al. ............................ | 210/521 |
| 2,798,042 | 7/1957 | Cox ........................................ | 210/521 |
| 3,529,728 | 9/1970 | Middelbeek et al. .................. | 210/540 |
| 3,923,659 | 12/1975 | Ullrich ................................... | 210/521 |
| 4,123,365 | 10/1978 | Middelbeek ........................... | 210/540 |
| 4,133,771 | 1/1979 | Pielkenrood .......................... | 210/521 |
| 4,136,012 | 1/1979 | Louboutin et al. .................... | 210/521 |
| 4,351,733 | 9/1982 | Salzer et al. .......................... | 210/521 |
| 4,422,931 | 12/1983 | Wolde-Michael .................... | 210/532.1 |
| 5,021,153 | 6/1991 | Haws ..................................... | 210/519 |

Primary Examiner—Christopher Upton
Attorney, Agent, or Firm—Pollock, Vande Sande & Priddy

[57] ABSTRACT

Device for treating waste water, especially rainwater by jointly carrying out degritting, degreasing and settling, which includes a degritter fitted with a grit trough, passed through by a descending then ascending flow of the water to be treated, a degreasing surface provided above a part of the degritter and the feed region of the settling tank, and a settling tank which includes a feed or presettling basin, a floor, a laminar settling region and an extraction trough, wherein the partition separating the degritter from the settling tank includes a flap valve making it possible, when it is open, to transfer the untreated water without perturbation towards the settling tank, and therefore allowing correct settling during this filling phase.

10 Claims, 2 Drawing Sheets

DEVICE FOR TREATING WASTE WATER ESPECIALLY RAINWATER

The present invention relates to a device for treating water and it more particularly relates to an improved device making it possible jointly to carry out degritting, degreasing and settling of the waste water or of the rainwater.

The present applicant has described and claimed, in FR-A-2,679,223, a method and apparatus for treating water which also makes it possible, in a single device, to carry out simultaneously, in particular, degritting, degreasing, coagulation, flocculation and settling of waste water.

The present invention is intended to provide improvements to this type of device, especially with a view to adapting it to an intermittent operating mode, in particular for treating rainwater.

One of the objects of the invention consists in employing technologies favoring the treatment even during filling of the device, carrying out selective removal of the scum, the sludge and the layer of clarified water, and making it possible to carry out hydraulic cleaning of the device.

It is known that the poor quality of the effluent fed into a waste water treatment plant, during the start-up phase of this plant, becomes very significant in the case of occasional or short-term treatment of specific effluents, especially rainwater, because this start-up phase may constitute 10 to 50% of the rainfall event. The first object of the present invention is to minimize the negative effect of the initiation phase of a water treatment plant of the type mentioned hereinabove.

Moreover, it is known that the overall efficiency of such a water treatment plant with intermittent and short-term operation is greatly affected by the manner in which selective removal is carried out of the scum, the grit, the sludge and the clarified water layer removed, which is equal in volume to 5 to 40% of the total clarified volume. The second object of the present invention therefore consists in collecting and removing the various components mentioned hereinabove as simply as possible and as efficiently as possible.

Finally, the device of the type to which the invention relates does not operate frequently, and it is therefore not useful to employ a continuous grit, grease and sludge removal system. However, given that the device remains inactive for several days or even for several weeks, it is necessary to provide means of cleaning the floor of the construction of the device, in order to avoid fermentation or drying of the sludge at the bottom of the construction, which might lead to pollution of water during the restarting phase of the device. This is a further subject of the present invention.

Inconsequence, the present invention relates to a device which includes a degritter fitted with a grit trough, passed through by a descending then ascending flow of the water to be treated, a degreasing surface provided above a part of the degritter and the feed region of the settling tank, and a settling tank which includes a feed or presettling basin, a floor, a laminar settling region and an extraction trough. This device is characterized in that the partition separating the degritter from the settling tank includes a flap valve making it possible, when it is open, to transfer the untreated water without perturbation towards the settling tank, and therefore allowing correct settling during this filling phase.

According to the invention, the said flap valve is preferably a ballasted flap valve remaining closed in the absence of hydraulic load upstream of the partition on which it is mounted.

According to another characteristic of the present invention, a double extraction system is provided in the settling tank, in order to ensure separate removal of the layer of clarified water, on the one hand, and of the sludge and the scum, on the other hand, this double extraction system including:

means provided slightly above the top point of the floor of the settling tank, for removing the water without removing the sludge, it being possible for these means to be produced in the form of a pump or of a tube for removal by gravity, and means for removing the sludge and then the scum from the settling tank, these means, positioned at the bottom of the settling tank and made, preferably, in the form of a pump or the like, being activated after removal of the upper clarified water layer by the said first means, According to yet another characteristic of the present invention, the device includes clarified water storage enclosures intended for cleaning the floor of the settling tank.

According to the invention, the system for removing grit expected at the lower part of the degritter enclosure uses means provided by the invention for removing sludge, especially a transfer pump whose delivery is provided with two valves: one allowing removal towards the outflow pipe during drainage of the settling tank, the other ensuring transfer towards a trough or the like.

According to the invention, the floor of the settling tank is compartmented using a certain number of partitions, thus defining floor portions, each being assigned a water storage enclosure as well as a valve making it possible, by circulation of water, to clean this floor portion using the water contained in the said enclosure.

Other characteristics and advantages of the present invention will emerge from the description given hereinbelow with reference to the attached drawings which illustrate one embodiment thereof, given by way of example, and without any limiting character.

Figure 1:
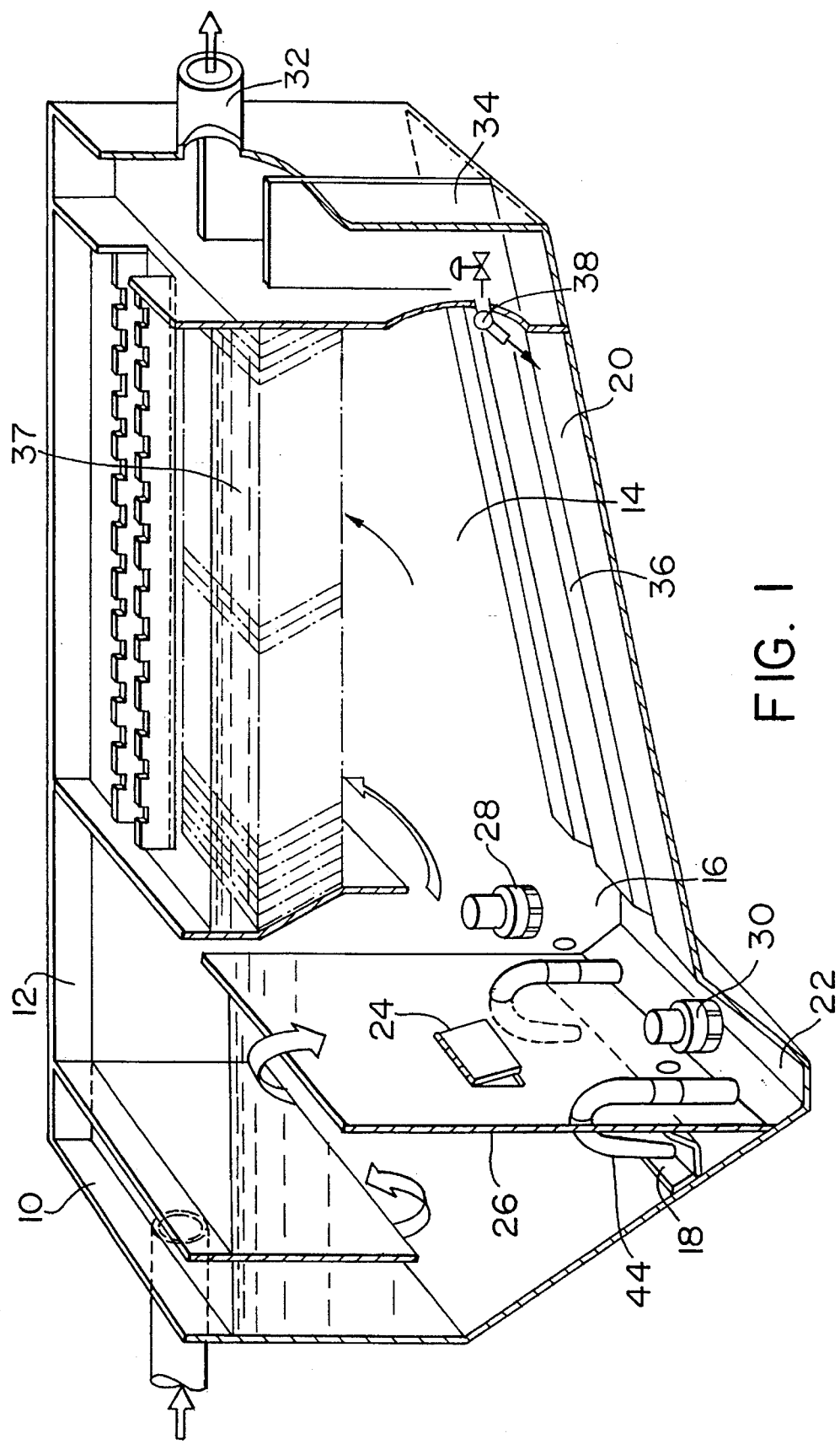
FIG. 1 is a diagrammatic perspective view representing a device according to the present invention.

As stated in the preamble of the present description, the device which is the subject of the present invention constitutes an improvement to that described in FR-A-2,679,223, to which reference may be made. This device therefore includes, as specified at the top of FIG. 2, a degritter 10, a degreasing surface 12, and a settling tank 14, here represented in the form of a laminar settling tank 37, this settling tank 14 being preceded by a presettling tank 16.

Figure 2:
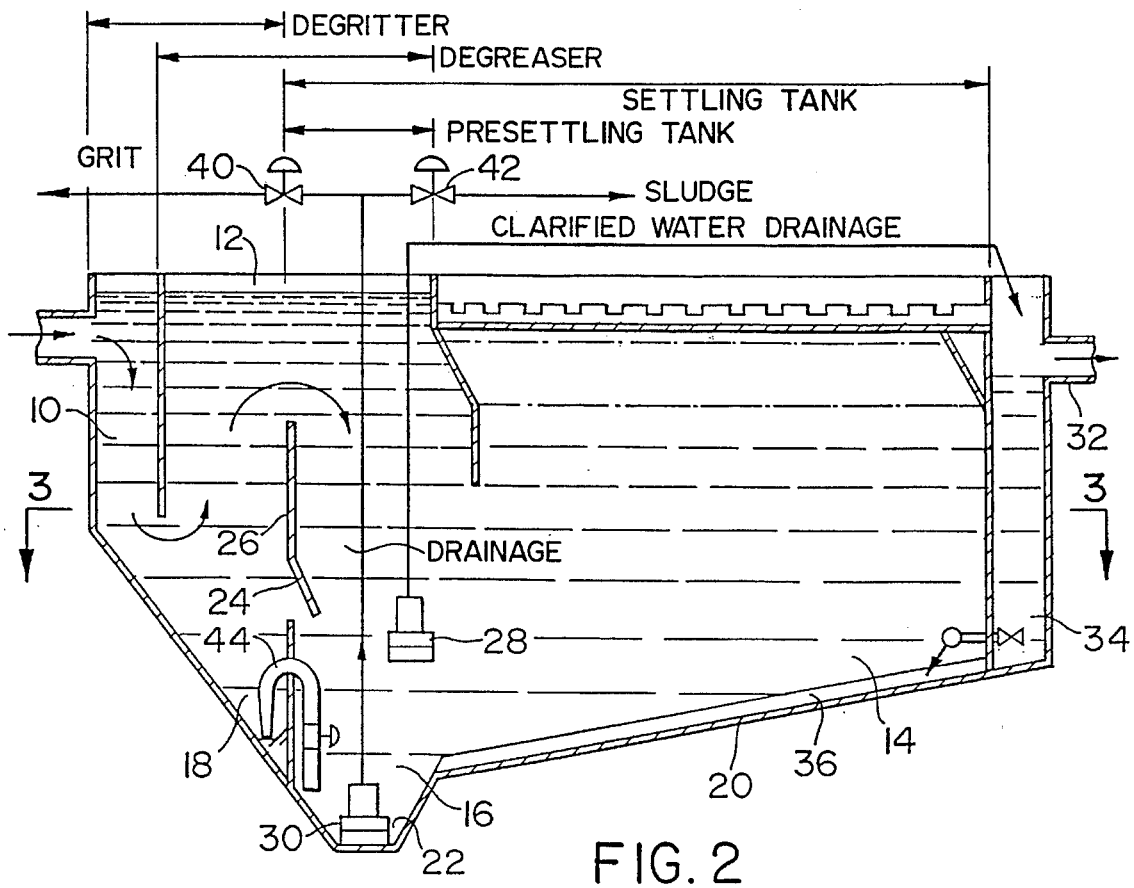
FIG. 2 is an axial section in vertical section of the device illustrated by FIG. 1.
Figure 3:
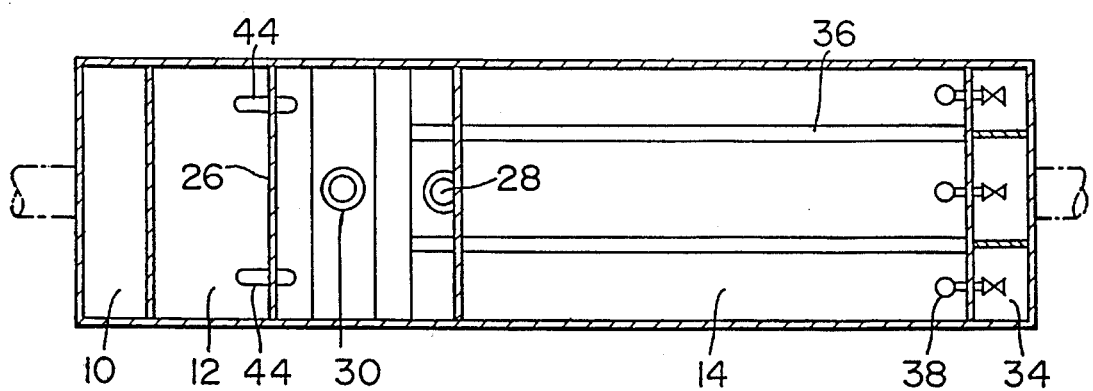
FIG. 3 is a section along 3—3 in FIG. 2.

The degritter 10 with its grit trough 18 is passed through by a descending then ascending flow of water to be treated, as illustrated in FIGS. 1 and 2. The degreasing surface 12 is located above a part of the degritter and the feed region of the settling tank 14 (above the presettling tank 16). The settling tank 14 includes a floor 20 and a sludge removal trough 22.

According to the invention, a flap valve such as 24 is provided, for example, of the ballasted wing type, on the partition 26 which separates the degritter 10 from the settling tank 14. This flap valve has a double purpose:

it allows settling during the phase of filling the construction of the plant: in fact, in the absence of such a valve in conventional plants, after filling the degritter, a drop of several meters of the untreated water in the settling tank occurs, which generates turbulence thus preventing settling. By virtue of the presence of the flap valve 24, the transfer of the untreated water towards the settling tank, after the filling of the enclosure of the degritter, takes place without significant perturbation or turbulence. This device therefore makes it possible to obtain correct clarification of the first layers of water taken into the device;

it makes it possible, during drainage of the settling tank, to recover the upper layer of water from the degritter, free of grit and clarified.

In the embodiment represented in the drawing, this flap valve 24 is made in the form of a ballasted flap valve which remains in the closed position in the absence of hydraulic load upstream of the partition 26.

According to the present invention, two extraction systems are provided, designed to ensure separate removal of the clarified water layer, on the one hand, and of the sludge and of the scum, on the other hand. In the embodiment illustrated in the drawings, this double removal system comprises:

1) a pump 28 (or a tube) placed slightly above the top point of the floor 20 of the settling tank, in order to remove the water without removing the sludge. The operation of this pump is interrupted when the water sheet level in the settling tank reaches a point located slightly above (a few tens of centimeters) the intake level of the pump 28, in order not to take in the scum;

a second pump 30 located at the bottom of the settling tank in the trough 22 of the latter, this second pump being turned on after the first pump 28 is turned off, under the conditions indicated hereinabove, so as to extract the sludge from the trough 22 and then the scum. The sludge and the grease thus extracted are generally removed to the outflow pipe, and therefore treated by the purification station after the high load period due to the rainfall event.

At the end on the treated water removal orifice 32 side, enclosures are provided for storing the clarified water. In FIG. 1, the device includes three storage troughs such as 34, bounded by walls and fed with clarified water coming from the laminar settling tank 37. These storage enclosures are provided by the invention for cleaning the floor 20 of the settling tank when it is no longer being used and they remain full when the device is being drained. The floor includes a plurality of separating partitions such as 36, making it possible to define floor portions, each of these portions being intended to be cleaned by the circulation of the water coming from at least one corresponding storage enclosure 34. For this purpose, each enclosure 34 includes a valve with a nozzle, such as 38, which, when it is opened, releases all or part of the water reserve contained in the storage enclosure in question. This water then sweeps over the corresponding floor portion and thus cleans it.

Naturally, the cleaning is carried out, floor portion by floor portion, by opening the various valves 38 in turn. This cleaning may be optimized by providing several partial flushes per floor portion, the drainage by pumping being carried out between each cleaning operation.

The device according to the invention is furthermore characterized, as was seen hereinabove, by an original grit removal system.

It is known that it is important for the grit collected during the degritting phase not to be removed at the same time as the sludge and the scum, because it can block the transfer pipes and the outflow pipes. This is the reason why the grit, after drainage of the settling tank, remains trapped in the grit trough 18 provided in the degritter. It was seen hereinabove that, in the invention, the clarified water layer contained at the top of the degritter (and which constitutes approximately 90% of the volume of the degritter) was removed via the flap valve 24 during the draining of the settling tank 14.

In order to avoid additional manufacturing and maintenance costs, the removal of the sand in the device according to the invention is carried out by means of the sludge and scum transfer pump 30.

For this purpose, the delivery of this pump is equipped with two separately opened valves 40 and 42, one allowing removal towards the outflow pipe during drainage of the settling tank, the other ensuring transfer towards a trough or any suitable removal means. In order to allow the pump 30 to be used in this way, it is necessary to transfer the grit from the trough 18 of the degritter into the trough 22 of the settling tank. This operation is carried out, according to the invention, using syphon tubes such as 44, and the operation is made possible by the fact that the trough 18 of the degritter is located above the trough 22 of the settling tank.

The operation is carried out in three phases:

a) Air is blown back through the syphon tube in order to unpack the grit. According to the invention, this blowing of air may be carried out, for example, by closing the syphon valve, using an air inlet located above the said valve.

b) The valve of the syphon tube is opened so as to transfer the grit towards the trough 22 of the settling tank, which trough is at a lower level; and c) The pump 30 is switched on in order to remove the grit.

Obviously, the device may furthermore include automation systems, in particular level sensors which manage the starting and stopping of the pumps 28 and 30 as well as the opening and closing of the valves for cleaning the floor 20, for isolating the syphon tubes 44, for injecting air, for removing the grit or the sludge, etc.

The operation of the device thus described is as follows:

1—Filling phase:

After the rainfall event, the device is empty.

The water fills first the grit trough 18 then the bottom of the settling tank through the opening released by the flap valve 24 which occupies the position illustrated by FIG. 2.

The degritter and the settling tank are therefore filled simultaneously and without fall or turbulence of untreated water through this opening. Settling is therefore possible during this start-up phase.

Before being removed through the removal pipe 32, the clarified water fills the storage enclosures 34. A level detector signals that the device is full and in production phase.

2—Production phase:

The untreated water deposits the grit and the coarsest particles in the grit trough 18. The flap valve 24 remains closed in the absence of sufficient hydraulic load to cause it to open. The water yields its floating components from the abovementioned degreasing region at the top of FIG. 2.

The feed region of the settling tank is wide and it therefore allows settling of the heaviest particles.

The water passes through the laminar settling tank 37 which retains the finest particles which slide and agglomerate on the various compartments of the floor 20 where they accumulate.

During this production phase, the particles also accumulate in the sludge trough 22 of the settling tank. In view of the short duration of the rainfall event, the height of sludge thus accumulated remains small.

3—Drainage phase:

The end of the rainfall event is signalled by a time-delay level detector. The pump 28 is then switched on after the time necessary for complete clarification of the water stored in the settling tank. This pump then removes the clear water layer located in the settling tank and in the upper part of the degritter, through the flap valve 24 which is in the open position, towards the clarified water removal pipe 32.

This pump stops at the intended level, mentioned hereinabove, that is to say slightly above the upper level of the floor 20, so as not to remove the scum or the bottom sludge. At this moment, the second pump 30 starts so as to extract this sludge and this scum through valve 42.

It should be noted that the floor 20 has a sufficient slope for most of the sludge to be able to slide as the water level falls. A detector at the lowest point of the water level triggers the stopping of the pump 30.

4—Floor cleaning phase

It has been seen that a storage enclosure such as 34, including a valve with nozzle 38, corresponds to each floor portion defined by the partitions such as 36.

The floors are cleaned one after the other by opening this valve 38 and partially draining the corresponding storage enclosure 34. The quantity of water used on each cleaning is less than the volume of the sludge trough 22, in order to ensure cleaning of all the floor. This water is removed via the pump 30 before proceeding to cleaning of the following-floor portion.

The lowest level detector in the settling tank stops the operation of the pump 30 and allows washing of the following floor portion.

Depending on the case, each floor portion may be cleaned from one to three times, for example.

5—Removal of the grit

The grit may be removed following the cleaning operation if the device includes a specific reception construction such as a trough, hopper, etc. Extraction may be delayed if the operation is carried out by a drainage lorry, for example.

The grit removal operation is carried out in the following manner:

Unpacking the grit by injecting air as described hereinabove;

Opening the valve of the syphon tube 44;

Transfer of the sand by syphoning into the sludge trough 22; and

Pumping the grit via the pump 30 towards the reception construction (trough, hopper, drainage lorry, etc.), after opening the valve 40.

6—Device shut down

The device is empty and cleaned, the various valves are closed and the pumps are stopped.

Clearly, the present invention is not limited to the embodiments described and/or represented here, but it moreover encompasses all the variants thereof.

We claim:

1. An apparatus for treating waste water, comprising:

degritting means for separating grit from waste water that has underdone descending then ascending flow, the degritting means having a grit trough at the bottom of the descending flow;

a settling tank located upstream of the degritting means for receiving waste water that has undergone degritting;

an upper surface of the degritting means and the settling tank being contained within walls that degrease the waste water;

a partition separating the degritting means from the settling tank;

flap valve means located at a preselected height below the top of the partition for selectively transferring waste water, free of perturbation and free of grit, to the settling tank during filling of the settling tank;

the settling tank including
(a) a downstream trough for collecting scum and sludge from waste water flowing into the settling tank from the degritting means;
(b) laminar settling means, upstream of the degritting means for filtering particulate matter from waste water delivered from the degritting means; and
(c) a floor upon which collects filtered particulate matter;

a storage trough, located upstream of the settling means for collecting waste water that has been clarified; and outlet means for delivering clarified waste water from the apparatus.

2. The apparatus described in claim 1 wherein the settling tank further comprises a double extraction device for ensuring separate removal of a layer of clarified water and the sludge and scum in the settling tank.

3. The apparatus described in claim 2 wherein the double extraction device further comprises:

first pumping means located at a height above the top of the settling tank floor for removing clarified waste water;

second pumping means located at the bottom of the settling tank for removing sludge and scum from the settling tank after removal of clarified waste water by the first pumping means.

4. The apparatus described in claim 3 further comprising separate valve means, connected to the second pumping means, for either extracting sludge and scum during drainage of the settling tank, or extracting grit, during cleaning of the settling tank floor.

5. The apparatus described in claim 1 wherein the storage trough further comprises means communicating with the settling tank floor for cleaning the floor.

6. The apparatus described in claim 5 further comprising:

channels formed in the floor of the settling tank;

means for dividing the storage trough into compartments equal in number to the channels; and nozzle means for delivering forced flow of clarified water in the compartments to the channels, thereby cleaning the channels.

7. The apparatus described in claim 6 further comprising valve means connected to the nozzle means for selectively operating one nozzle at a time during cleaning.

8. The apparatus described in claim 6 further comprising means for operating the nozzles several consecutive times per channel; and means for draining of the settling tank between cleaning operations.

9. The apparatus described in claim 1 further comprising means located in the grit trough for removing sludge and scum accumulating thereat.

10. The apparatus described in claim 1 wherein the flap valve is ballasted and remains closed in the absence of hydraulic load upstream of the partition.

* * * * *